(12) United States Patent
Brannick et al.

(10) Patent No.: US 7,738,644 B2
(45) Date of Patent: Jun. 15, 2010

(54) METHODS, SYSTEMS, AND COMPUTER PROGRAM PRODUCTS FOR FLEXIBLE CALL JUMPING

(75) Inventors: Gary Lee Brannick, Plano, TX (US); Gerardo Delgadillo, Frisco, TX (US); Balagopal Gopa Kumar, McKinney, TX (US)

(73) Assignee: BroadSoft M6, LLC, Gaithersburg, MD (US)

( * ) Notice: Subject to any disclaimer, the term of this patent is extended or adjusted under 35 U.S.C. 154(b) by 0 days.

(21) Appl. No.: 11/899,412

(22) Filed: Sep. 5, 2007

(65) Prior Publication Data

US 2008/0056475 A1 Mar. 6, 2008

Related U.S. Application Data (60) Provisional application No. 60/842,712, filed on Sep. 6, 2006, provisional application No. 60/848,022, filed on Sep. 28, 2006.

(51) Int. Cl.
*H04M 3/42* (2006.01)

(52) U.S. Cl. ............... 379/212.01; 379/211.01; 379/211.02; 379/215.01; 379/201.01; 379/201.12; 379/207.12; 379/219

(58) Field of Classification Search ............ 379/212.01, 379/211.01, 211.02, 215.01, 201.01, 201.12, 379/207.12, 219
See application file for complete search history.

(56) References Cited

U.S. PATENT DOCUMENTS

| 5,329,578 | A  | * | 7/1994 | Brennan et al. | 379/211.03 |
| 6,473,612 | B1 |   | 10/2002 | Cox et al. | |
| 6,853,718 | B1 | * | 2/2005 | Bedingfield et al. | 379/212.01 |
| 7,092,385 | B2 |   | 8/2006 | Gallant et al. | |
| 7,106,848 | B1 | * | 9/2006 | Barlow et al. | 379/212.01 |
| 2005/0083948 | A1 | * | 4/2005 | Hiroshima et al. | 370/395.52 |
| 2007/0116234 | A1 | * | 5/2007 | Schneider et al. | 379/219 |

OTHER PUBLICATIONS

Derwent No. 2007-610822, Adams et al., Call transferring method for e.g. communication system involves initiating call transfer request comprising access phone number that is utilized to route call to device e.g. voice over Internet protocol application server, Appldate: Oct. 19, 2005.*

Notification of Transmittal of the International Search Report and the Written Opinion of the International Searching Authority, or the Declaration for International Application No. PCT/US07/19436 (Jul. 25, 2008).

* cited by examiner

*Primary Examiner*—Quynh H Nguyen
(74) *Attorney, Agent, or Firm*—Jenkins, Wilson, Taylor & Hunt, P.A.

(57) ABSTRACT

Methods, systems, and computer program products for flexible call jumping are disclosed. According to one method, an indication is received from a calling phone for initiating a call with a called phone. The call is established between the called and calling phone. During the call, an indication is received from the calling phone to jump the call to a user selected destination. In response to receiving the indication to jump the call, the call is jumped to the destination such that the call continues between the destination and the called phone.

18 Claims, 6 Drawing Sheets

ND COMPUTER
METHODS, SYSTEMS, AND COMPUTER PROGRAM PRODUCTS FOR FLEXIBLE CALL JUMPING

RELATED APPLICATIONS

This application claims the benefit of U.S. Provisional Patent Application Ser. No. 60/842,712, filed Sep. 6, 2006 and U.S. Provisional Patent Application Ser. No. 60/848,022, filed Sep. 28, 2006; the disclosures of which are incorporated herein by reference in their entireties.

TECHNICAL FIELD

The subject matter described herein relates to call jumping. More particularly, the subject matter described herein relates to methods, systems, and computer program products for flexible call jumping.

BACKGROUND

With the emergence of IP application servers, it has become desirable to use such servers to provide advanced features to telecommunications subscribers. One feature that it may be desirable to provide is call jumping. Call jumping refers to the ability to transfer an in-progress call from one phone to another phone without dropping the call. For example, a subscriber who initiates a call from his or her office phone may desire to transfer the call to his or her mobile phone in order to continue to call when the subscriber leaves the office.

Call jumping is currently available for inbound calls. That is, a subscriber who receives a call can elect to jump the call to another phone and continue to call from the other phone. However, it is believed that current networks do not allow call jumping from an outbound call. That is, the calling party does not currently have the capability to jump the call to a new destination.

Another shortcoming of existing services is combining call jumping with other features, such as remote phone. Remote phone is a feature that allows a subscriber to provision one phone, such as the subscriber's mobile phone, to masquerade as another phone. For example, a subscriber may desire to have all calls directed to his or her office phone ring on the subscriber's mobile phone. Outbound calls from the mobile phone will appear to called parties as if the calls are made from the subscriber's office phone. Once the subscriber has the remote phone feature activated, the subscriber may desire to implement inbound or outbound call jumping from the remote phone. It is believed that current call jumping implementations do not provide this capability.

Accordingly, in light of these difficulties associated with existing call jumping solutions, there exists a need for methods, systems, and computer program products for flexible call jumping.

SUMMARY

The subject matter described herein includes methods, systems, and computer program products for flexible call jumping. According to one aspect, a method for implementing a call jump from an outbound call is provided. The method includes receiving an indication from a calling phone for initiating a call with a called phone. A call is established between the called and calling phone. During the call, an indication is received from the calling phone to jump the call to a user's selected destination and, in response to receiving the indication to jump the call, the call is jumped from the calling phone to the destination so that the call continues between the destination and the called phone.

The subject matter described herein for flexible call jumping may be implemented using a computer program product comprising computer executable instructions embodied in a computer readable medium. Exemplary computer readable media suitable for implementing the subject matter described herein include chip memory devices, disk memory devices, programmable logic devices, and application specific integrated circuits. In addition, a computer program product that implements the subject matter described herein may be implemented using a single device or computing platform or may be distributed across multiple devices or computing platforms.

An object of the presently disclosed subject matter having been stated hereinabove, and which is achieved in whole or in part by the presently disclosed subject matter, other objects will become evident as the description proceeds when taken in connection with the accompanying drawings as best described hereinbelow.

DETAILED DESCRIPTION

Figure 1:
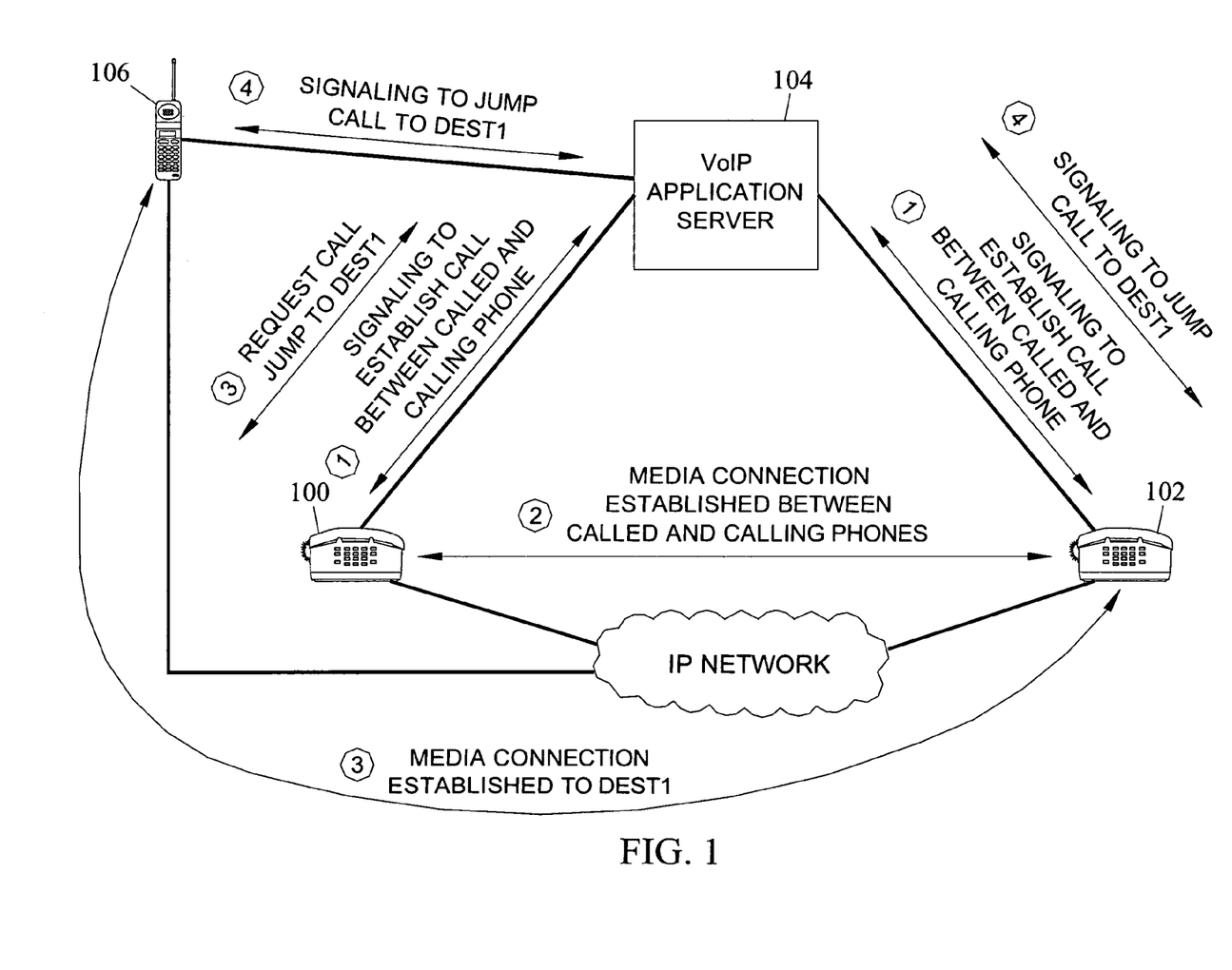
FIG. 1 is a network diagram illustrating call jumping from an outbound call according to an embodiment of the subject matter described herein.

The subject matter described herein includes methods, systems, and computer program products for flexible call jumping. FIG. 1 is a network diagram illustrating an exemplary system for flexible call jumping according to an embodiment of the subject matter described herein. Referring to FIG. 1, a first phone 100 may seek to establish a call with a second phone 102. Phones 100 and 102 may be any types of phones. Examples of phone types include PSTN phones, mobile phones, IP phones, or combinations thereof. In the illustrated example, phones 100 and 102 are assumed to be IP phones. A voice over IP application server 104 may provide the functionality for flexible call jumping according to an embodiment of the subject matter described herein. Voice over IP application server 104 may be implemented on a computing platform that performs signaling for jumping calls and that provides applications for providing features for different phones.

An exemplary hardware platform suitable for implementing voice over IP application server 104 is the T6000 platform available from Tekelec of Morrisville, N.C. An exemplary software architecture for voice over IP application server 104 will be described in detail below.

In the illustrated example, a user of phone 100 may seek to establish a call with a user of phone 102. Accordingly, signaling may occur between phone 100 and/or its associated end office and voice over IP application server 104 to establish the media connection. Similarly, signaling may also occur between voice over IP application server 104 and phone 102 or its associated end office. Once the signaling is complete and the called party associated with phone 102 answers, a media connection is established between phones 100 and 102 as indicated by arrow 2 in the diagram.

Once a call is established between phones 100 and 102, the user of phone 100 may request a call jump to destination 1. In the illustrated example, destination 1 corresponds to a phone 106, which is a mobile telephone. Once a jump is requested, signaling occurs between voice over IP application server 104 and phones 102 and 106 to jump the call to the new destination. Once the signaling is complete, a media connection is established between phone 102 and destination 1 106, as indicated by the arrow labeled 5 in the diagram.

Figure 2:
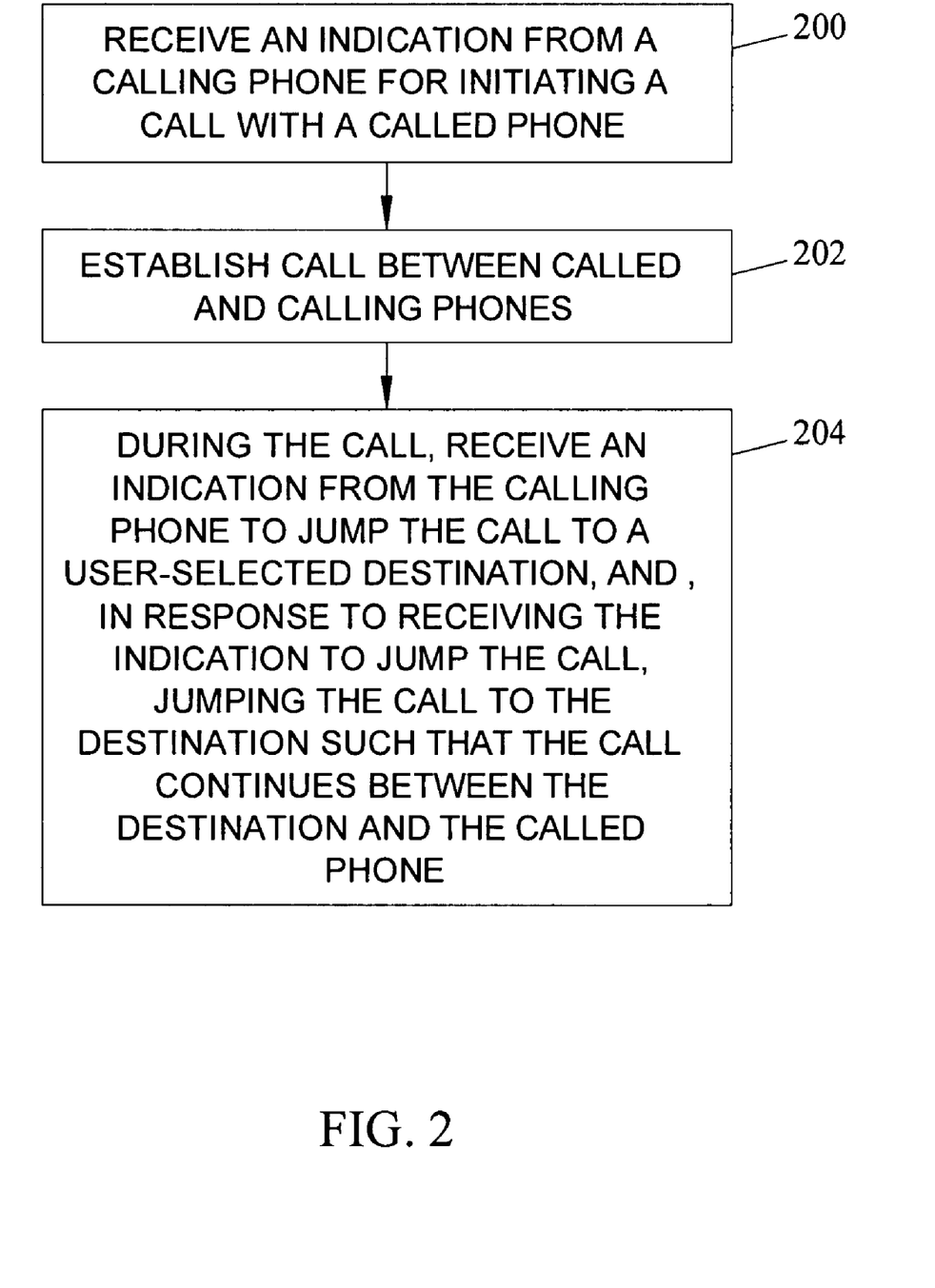
FIG. 2 is a flow chart illustrating exemplary overall steps for implementing call jumping from an outbound call according to an embodiment of the subject matter described herein.

FIG. 2 is a flow chart illustrating exemplary steps that may be performed by voice over IP application server 104 to establish a call jump from an outbound call according to an embodiment of the subject matter described herein. Referring to FIG. 2, in step 200, voice over IP application server 104 receives an indication from a calling phone for initiating a call with a called phone. In step 202, voice over IP application server 104 establishes a call between the called and calling phones.

In block 204, during the call, voice over IP application server 104 receives an indication from the calling phone to jump the call to a user selected destination. In response to receiving the indication, voice over IP application server 104 jumps the call to the destination such that the call can continue between the destination and the called phone.

Figure 3A:
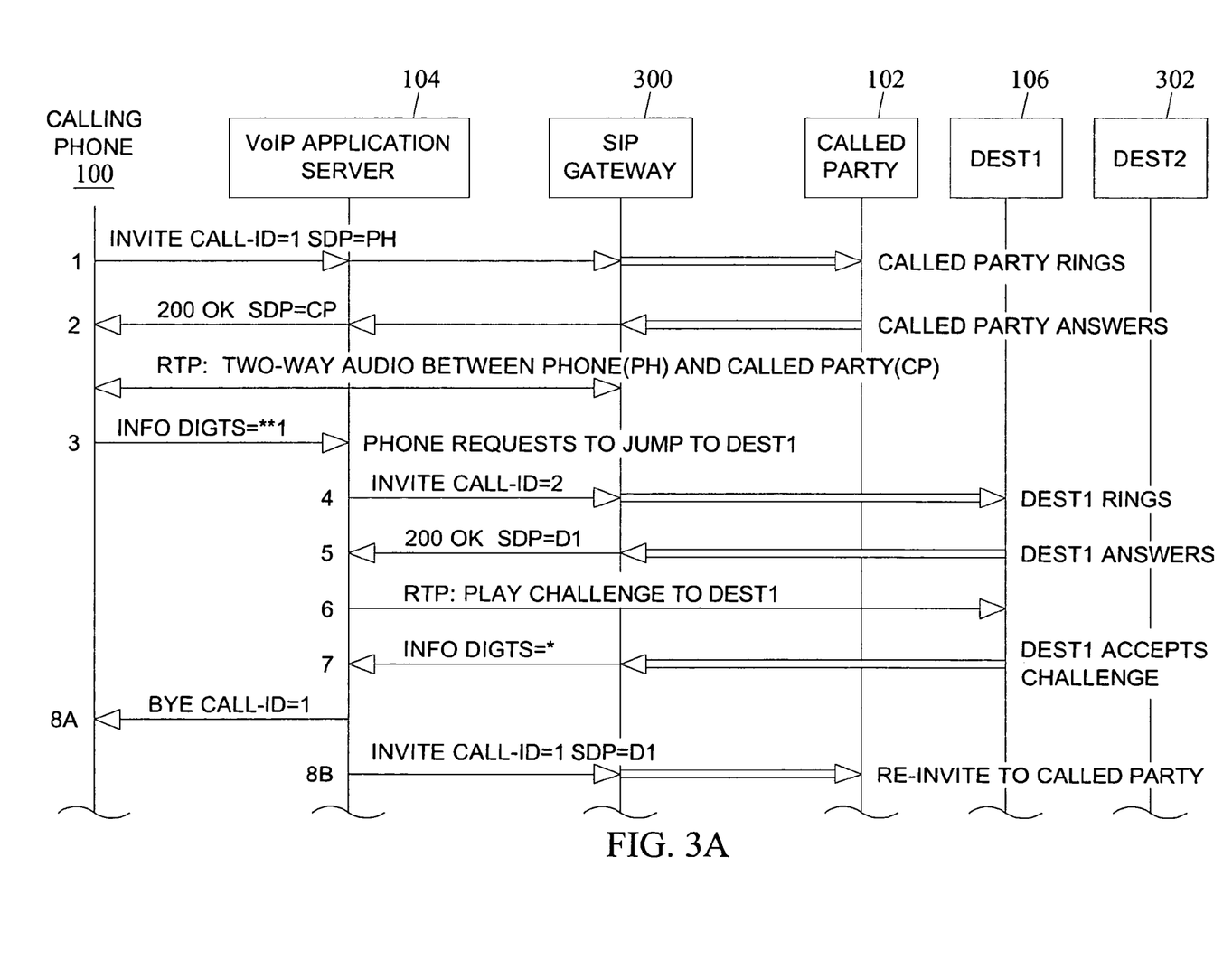
FIGS. 3A and 3B are a call flow diagram illustrating exemplary messages in implementing call jump from an outbound call according to an embodiment of the subject matter described herein.
Figure 3B:
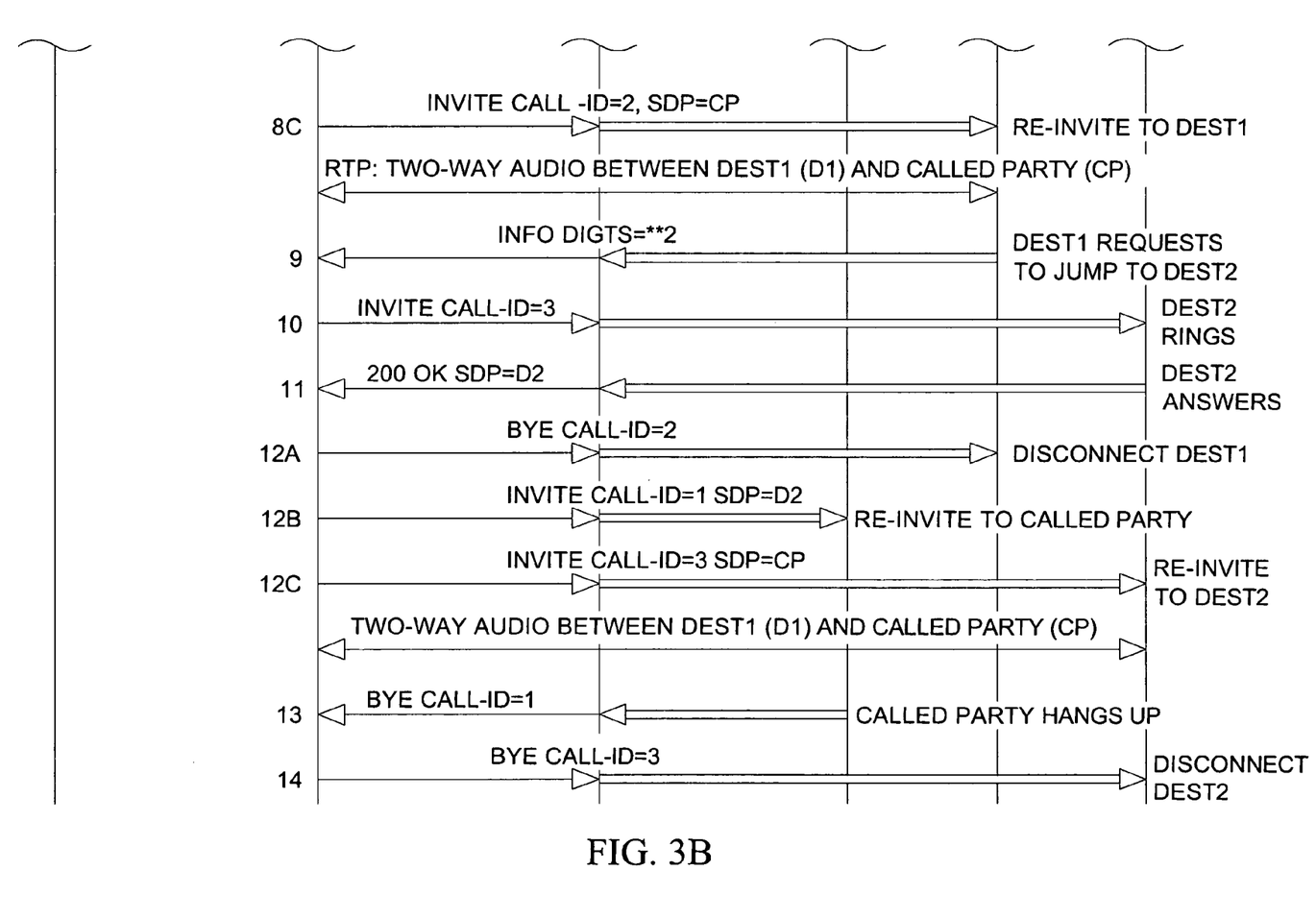

FIGS. 3A and 3B are a call flow diagram illustrating exemplary signaling messages exchanged between calling phone 100, voice over IP application server 104, a SIP gateway 300, called phone 102, destination 1 106, and a second destination 302 for performing outbound call jumps according to an embodiment of the subject matter described herein. Referring to FIG. 3A, in line 1, calling phone 100 sends a SIP INVITE message to voice over IP application server 104 to initiate a call with called phone 102. Voice over IP application server 104 sends the INVITE message to SIP gateway 300, which sends the corresponding SS7 message to an end office associated with called phone 102. In response to the call initiation request, the called phone 102 rings.

In line 2 of the call flow diagram, the called party answers, and an answer message is communicated to SIP gateway 300. SIP gateway 300 sends a 200 OK message to voice over IP application server 104, which sends a description of the media capabilities of called phone 102 to calling phone 100. After line 2, a two way real-time transmission protocol (RTP) media stream is established between calling phone 100 and called phone 102.

In line 3 of the call flow diagram, calling phone 100 requests a call jump from the outbound call by dialing predetermined DTMF digits, which in the illustrated example are "1." In this example,  indicates a call jump and 1 indicates a jump to destination 1. In line 4 of the call flow diagram, voice over IP application server 104 initiates a call to destination 1 106. Destination 1 106 rings in response to its end office receiving the corresponding signaling. In line 5 of the call flow diagram, the terminal at destination 1 106 is answered. The terminal at destination 1 may be answered by the original calling party who requested that the call be jumped to destination 1 in line 3. Signaling indicating that the destination terminal has been answered along with the media capabilities of the terminal associated with destination 1 is communicated to voice over IP application server 104.

In line 6 of the call flow diagram, voice over IP application server 104 plays a challenge to destination 1 106. The challenge may be a request that the calling party at destination 1 106 enter predetermined digits to complete the call jump. Requiring that the calling party enter DTMF digits to complete the jump reduces the likelihood that the call will be connected to a destination not desired by the calling party, such as an answering machine. In line 7 of the call flow diagram, destination 1 106 accepts the challenge by communicating the predetermined digits to voice over IP application server 104.

In lines 8A-8C of the call flow diagram, voice over IP application server 104 idles the call to calling phone 100 and reinvites called phone 102 and destination 1 106 to jump the call. After line 8C, a two way audio stream exists between destination 1 106 and called phone 102.

Referring to FIG. 3B, in line 9 of the call flow diagram, destination 1 106 requests a second call jump to jump the call to destination 2 302. In line 10 of the call flow diagram, voice over IP application server 104 signals destination 2 to establish a call between destination 2 and called phone 102. In line 11 of the call flow diagram, the terminal at destination 2 302 is answered, and voice over IP application server 104 is notified of the answer via a 200 OK message.

In lines 12A-12C of the call flow diagram, voice over IP application server 104 idles the call to destination 1106 and reinvites called phone 102 and destination 2 302 to the call. After line 12C, a two way audio stream exists between destination 2 302 and called phone 102. In line 13 of the message flow diagram, the called party hangs up, and in line 14, voice over IP application server 104 signals to disconnect the call from destination 2 302.

Thus, using the signaling illustrated in FIGS. 3A and 3B, a call jump can be initiated from an outbound call. In addition, multiple call jumps can be performed for the same call.

Figure 4:
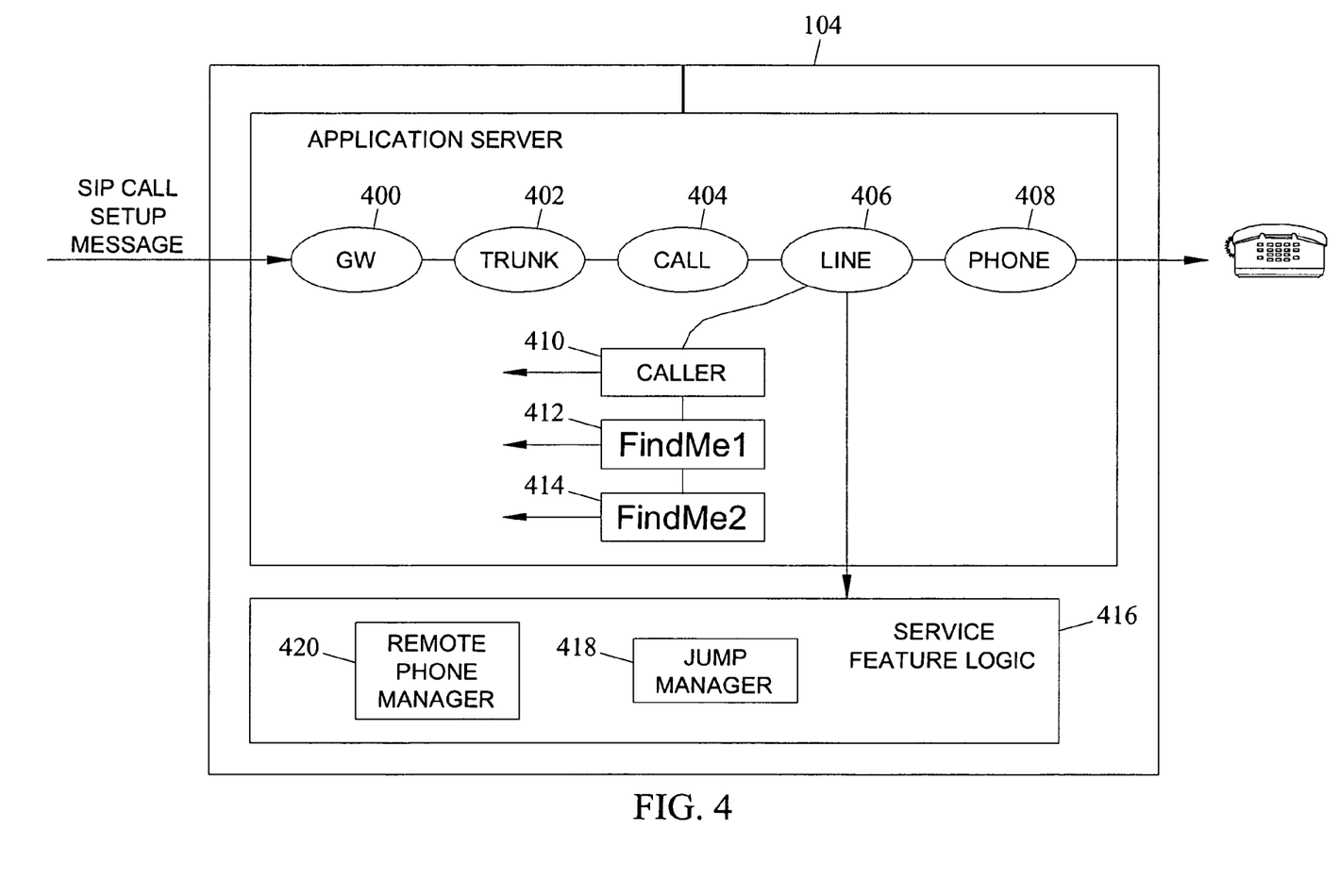
FIG. 4 is a block diagram illustrating exemplary components of a voice over IP application server for implementing flexible call jumping according to an embodiment of the subject matter described herein.

FIG. 4 is a block diagram illustrating an exemplary software architecture of voice over IP application server 104 for implementing call jumps according to an embodiment of the subject matter described herein. Referring to FIG. 4, voice over IP application server includes a plurality of components 400-414 that correspond to actual telecommunications network elements. For example, a gateway component 400 may perform gateway functionality, such as conversion between SIP and another form of signaling, such as SS7. Trunk component 402 may correspond to aspects of a physical trunk. Call component 404 may store attributes of a call in progress. For example, call component 404 may maintain call state information. Line component 406 may be implemented on a per subscriber basis and store attributes of a subscriber's line. Phone component 408 may store information about a subscriber's phone, such as the phone's media capabilities and contact information. Caller component 410 may store attributes about an incoming caller. Find me components 412 and 414 may implement find me service, such as simultaneously or sequentially ringing phones of a subscriber.

Voice over IP application server 104 also includes services feature logic 416 for implementing advanced features, such as call jumping. In the illustrated example, services feature logic 416 includes a jump manager 418 for initiating call jumps from inbound and/or outbound calls. Jump manager 418 may also initiate call jumps from remote phones, as will be described in more detail below.

In operation, when an incoming call arrives at phone component 408, the incoming call event is passed to line component 406. Line component 406 presents the event to service feature logic 416. Service feature logic 416 analyzes the event for DTMF or other codes indicating a call jump or other features. In this example, it is assumed that the requested feature is a call jump. Accordingly, jump manager 418 creates a jump call and initiates signaling to jump the call to the new destination.

As stated above, another aspect of the subject matter described herein includes performing a call jump from a remote phone. As used herein, the term "remote phone" refers to a phone that masquerades as another phone. For example, a user may desire to forward his or her office phone to a cell phone such that calls made from the cell phone will appear as though they were made from the user's office phone. Similarly, calls made to the user's office phone may ring the user's cell phone, and the call may appear to the calling party as if it was made to the user's office phone. It may also be desirable for the user to perform call jumps from the remote phone. In FIG. 4, call establishing calls to or from a remote phone may be performed by remote phone manager 420.

Figure 5:
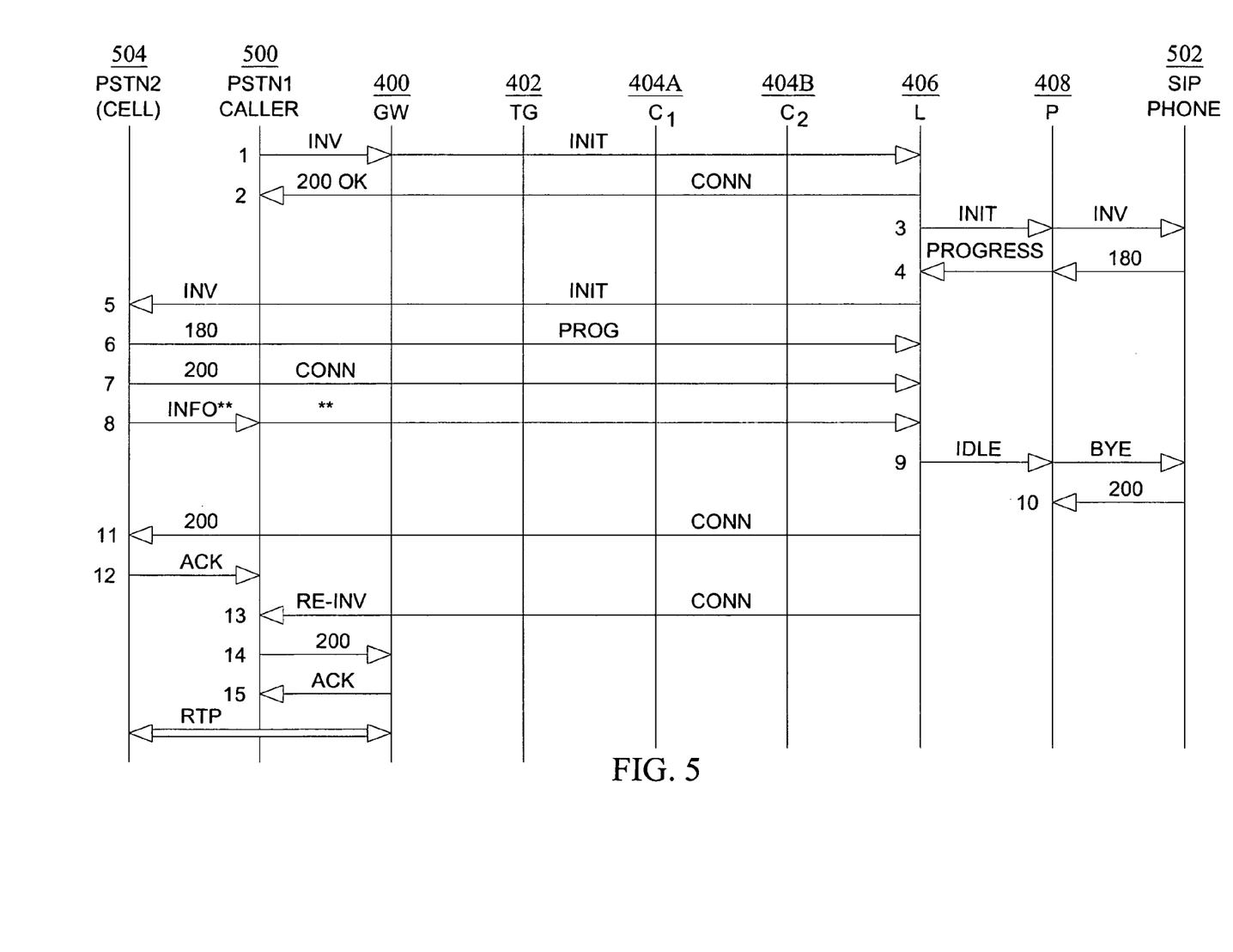
FIG. 5 is a call flow diagram illustrating exemplary messages associated with implementing a call jump from a remote phone according to an embodiment of the subject matter described herein.

FIG. 5 is a call flow diagram illustrating exemplary signaling for performing a call jump from a remote phone according to an embodiment of the subject matter described herein. In the example illustrated in FIG. 5, the calling phone is indicated by reference numeral 500, the called phone is indicated by reference numeral 502 and the remote phone is indicated by reference numeral 504.

In the call flow, in line 1, calling phone 100 invites called phone 502 to a call by sending an INVITE message to line component 406 of gateway 104. In line 2 of the call flow diagram, line component 406 sends a connect message to calling phone 500, which is converted into a 200 OK message. In line 3 of the call flow diagram, line component 406 sends an initialization message to phone component 408, which sends an INVITE message to called phone 502. In line 4, once the called phone is answered, a PROGRESS message is communicated to line component 406. In line 5 of call flow diagram, line component 406 invites remote phone 504 to participate in the call. In line 6, a progress message is communicated to line component 406. In line 7, when remote phone 504 is answered, a CONNECT message is communicated to line component 406.

In line 8, remote phone 504 initiates a call jump by sending predetermined digits to line component 406. In line 9, line component 406 disconnects the call from SIP phone 502. In line 10, SIP phone 502 acknowledges the disconnection. In line 11, line component 406 sends a CONNECT message to remote phone 504. In line 12, remote phone 504 acknowledges the connection.

In line 13, line component 406 reinvites calling phone 500 to the call. In lines 14 and 15, the reinvitation is acknowledged. After line 15, an RTP media stream exists between remote phone 504 and phone 500.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for implementing a call jump from an outbound call, the method comprising:
   (a) receiving a session initiation protocol (SIP) message from a calling phone associated with a calling party for initiating a call with a called phone;
   (b) establishing the call between called phone and calling phone using a voice over IP (VoIP) application server; and
   (c) during the call, receiving at the VoIP application server an indication from the calling phone to jump the call to a user-selected destination, and, in response to receiving the indication to jump the call, jumping the call to the destination such that the call continues between the destination and the called phone, wherein jumping the call includes:
      (i) establishing, using SIP signaling, a media connection between the VoIP application server and the destination
      (ii) issuing a challenge to the destination over the media connection, wherein issuing a challenge to the destination includes requesting that the calling party at the destination enter predetermined digits to complete the jumping of the call; and
      (iii) in response to receiving the predetermined digits from the calling party at the destination over the media connection, initiating signaling from the VoIP application server to establish an audio stream between the called phone and the destination, wherein the destination comprises a phone separate from the called phone and wherein establishing the call between the calling phone and the called phone includes sending a SIP Invite message to a SIP gateway and wherein the SIP gateway generates and sends a corresponding SS7 message to an end office associated with the called phone.

2. The method of claim 1 wherein the calling phone comprises any one of a PSTN phone, a mobile phone, and an IP phone.

3. The method of claim 2 wherein the called phone comprises any one of a PSTN phone, a mobile phone, and an IP phone.

4. The method of claim 3 wherein the calling phone comprises a SIP phone.

5. The method of claim 4 wherein receiving an indication to jump the call includes receiving predetermined DTMF digits from the calling phone identifying the destination.

6. The method of claim 1 wherein the calling phone comprises a remote phone provisioned to masquerade as another phone.

7. The method of claim 1 wherein the destination comprises a destination provisioned by the calling party.

8. The method of claim 1 wherein the destination comprises a nonprovisioned destination selected on the fly by the calling party.

9. A system for initiating a call jump from an outbound call, the system comprising:
   (a) a line component for receiving a session initiation protocol (SIP) message from a calling phone associated with a calling party for initiating a call with a called phone and for receiving, during the call, an indication from the calling phone to jump the call to a destination;
   (b) a SIP gateway for establishing the call between the called phone and calling phone, wherein the SIP gateway receives a SIP Invite message from a VoIP application server and generates and sends a corresponding SS7 message to an end office associated with the called phone; and
   (c) a jump manager associated with the VoIP application server for receiving the indication from the line component to jump the call and, in response, for jumping the call to the destination such that the call continues between the destination and the called phone, wherein jumping the call includes:

(i) establishing, using SIP signaling, a media connection between a Voice over Internet Protocol (VoIP) application server and the destination;
(ii) issuing a challenge to the destination over the media connection, wherein issuing a challenge to the destination includes requesting that the calling party at the destination enter predetermined digits to complete the jumping of the call; and
(iii) in response to receiving the predetermined digits from the calling party at the destination over the media connection, initiating signaling from the VoIP application server to establish an audio stream between the called phone and the destination, wherein the destination comprises a phone separate from the called phone.

10. The system of claim 9 wherein the calling phone comprises any one of a PSTN phone, a mobile phone, and an IP phone.

11. The system of claim 10 wherein the called phone comprises any one of a PSTN phone, a mobile phone, and an IP phone.

12. The system of claim 11 wherein the calling phone comprises a SIP phone.

13. The system of claim 12 wherein the predetermined digits includes predetermined DTMF digits received from the calling phone identifying the destination.

14. The system of claim 9 wherein the calling phone comprises a remote phone provisioned to masquerade as another phone.

15. The system of claim 9 wherein the destination comprises a destination configured by the calling party.

16. The system of claim 9 wherein the destination comprises a nonprovisioned destination selected on the fly by the calling party.

17. A computer readable medium having stored thereon computer executable instructions that when executed by a processor of a computer performs the steps comprising:

(a) receiving a session initiation protocol (SIP) message from a calling phone associated with a calling party for initiating a call with a called phone;
(b) establishing the call between called phone and calling phone using a voice over IP (VoIP) application server; and
(c) during the call, receiving at the VoIP application server an indication from the calling phone to jump the call to a user-selected destination, and, in response to receiving the indication to jump the call, jumping the call to the destination such that the call continues between the destination and the called phone, wherein jumping the call includes:
(i) establishing, using SIP signaling, a media connection between the VoIP application server and the destination;
(ii) issuing a challenge to the destination over the media connection, wherein issuing a challenge to the destination includes requesting that the calling party at the destination enter predetermined digits to complete the jumping of the call; and
(iii) in response to receiving the predetermined digits from the calling party at the destination over the media connection, initiating signaling from the VoIP application server to establish an audio stream between the called phone and the destination, wherein the destination comprises a phone separate from the called phone and wherein establishing the call between the calling phone and the called phone includes sending a SIP Invite message to a SIP gateway and wherein the SIP gateway generates and sends a corresponding SS7 message to an end office associated with the called phone.

18. The computer readable medium of claim 17 wherein the steps are implemented using a the VoIP application server.

* * * * *